United States Patent
Desfriches et al.

(10) Patent No.: US 8,589,044 B2
(45) Date of Patent: Nov. 19, 2013

(54) METHOD FOR PROCESSING A SIGNAL ORIGINATING FROM A POSITION SENSOR OF A MOTOR VEHICLE CONTROL MEMBER

(75) Inventors: Christophe Desfriches, Pacy-sur-Eure (FR); Alessandro Monti, La Garenne Colombes (FR); Richard Pothin, Jouars-Pontchartrain (FR)

(73) Assignee: Renault S.A.S., Boulogne-billancourt (FR)

( * ) Notice: Subject to any disclaimer, the term of this patent is extended or adjusted under 35 U.S.C. 154(b) by 520 days.

(21) Appl. No.: 12/667,954

(22) PCT Filed: Jun. 30, 2008

(86) PCT No.: PCT/FR2008/051202
§ 371 (c)(1),
(2), (4) Date: Mar. 23, 2010

(87) PCT Pub. No.: WO2009/007628
PCT Pub. Date: Jan. 15, 2009

(65) Prior Publication Data
US 2010/0185355 A1 Jul. 22, 2010

(30) Foreign Application Priority Data
Jul. 6, 2007 (FR) ...................................... 07 04891

(51) Int. Cl.
*G06F 7/00* (2006.01)
*G06F 17/00* (2006.01)
*G06F 19/00* (2011.01)

(52) U.S. Cl.
USPC .................................. 701/67; 701/68; 701/1

(58) Field of Classification Search
USPC .......................... 701/67, 68, 69, 91, 83, 1, 48
See application file for complete search history.

(56) References Cited

U.S. PATENT DOCUMENTS

| 4,081,065 A | * | 3/1978 | Smyth et al. ................... 477/176 |
| 4,561,530 A | * | 12/1985 | Parsons et al. ................. 477/176 |
| 4,747,051 A | * | 5/1988 | Hall et al. ......................... 701/93 |
| 4,899,858 A | * | 2/1990 | Cote et al. ......................... 477/83 |
| 5,082,096 A | * | 1/1992 | Yamashita et al. ............. 477/175 |
| 5,083,647 A | * | 1/1992 | Bulgrien ....................... 192/3.58 |
| 5,123,302 A | * | 6/1992 | Brown et al. .................. 477/154 |
| 5,275,267 A | * | 1/1994 | Slicker ........................... 477/176 |
| 5,316,116 A | * | 5/1994 | Slicker et al. .................. 477/181 |
| 5,439,428 A | * | 8/1995 | Slicker .......................... 477/175 |

(Continued)

FOREIGN PATENT DOCUMENTS

| DE | 103 18 883 | 11/2004 |
| FR | 2 828 450 | 2/2003 |

*Primary Examiner* — Bhavesh V Amin
(74) *Attorney, Agent, or Firm* — Oblon, Spivak, McClelland, Maier & Neustadt, L.L.P.

(57) ABSTRACT

A method for processing a signal originating from a position sensor of a motor vehicle control member, to produce a processed signal relating to the position of the control member. The method includes: a filtering phase in which the signal originating from the sensor is filtered using a first filter to obtain a first filtered signal, and a substitution phase in which the first filtered signal is supplied as the processed signal, a second signal being added to the first filtered signal if the instantaneous value thereof is greater than the value of a first threshold parameter, and, in the opposite case, the signal originating from the sensor is provided as the processed signal.

13 Claims, 2 Drawing Sheets

(56) References Cited

U.S. PATENT DOCUMENTS

| | | | |
|---|---|---|---|
| 5,630,773 A | 5/1997 | Slicker et al. | |
| 5,925,087 A * | 7/1999 | Ohnishi et al. | 701/70 |
| 6,185,485 B1 * | 2/2001 | Ashrafi et al. | 701/1 |
| 6,249,735 B1 * | 6/2001 | Yamada et al. | 701/65 |
| 6,602,161 B2 * | 8/2003 | Hemmingsen et al. | 477/79 |
| 6,640,951 B2 * | 11/2003 | Bamberger et al. | 192/85.01 |
| 6,647,333 B2 * | 11/2003 | Jager et al. | 701/51 |
| 7,109,379 B2 * | 9/2006 | Sato et al. | 568/322 |
| 7,206,682 B2 * | 4/2007 | Bodin et al. | 701/67 |
| 7,350,602 B2 * | 4/2008 | Colvin et al. | 180/65.28 |
| 7,536,272 B2 * | 5/2009 | Leminoux et al. | 702/173 |
| 2002/0134637 A1 * | 9/2002 | Salecker et al. | 192/54.1 |
| 2002/0161503 A1 * | 10/2002 | Joe et al. | 701/51 |
| 2004/0159523 A1 | 8/2004 | Duan et al. | |
| 2006/0011394 A1 * | 1/2006 | Colvin et al. | 180/65.2 |
| 2006/0106250 A1 * | 5/2006 | Sato et al. | 562/538 |
| 2006/0106520 A1 * | 5/2006 | Bodin et al. | 701/67 |

* cited by examiner

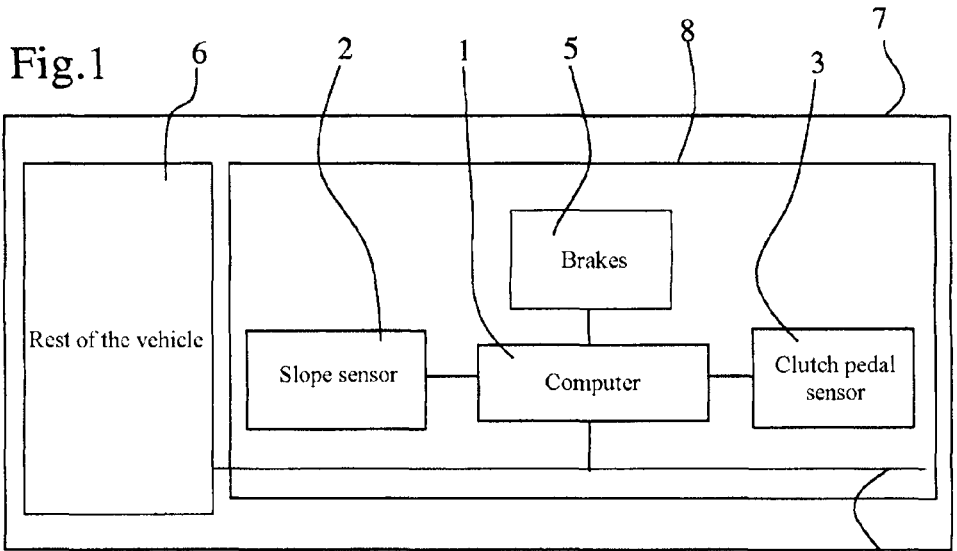
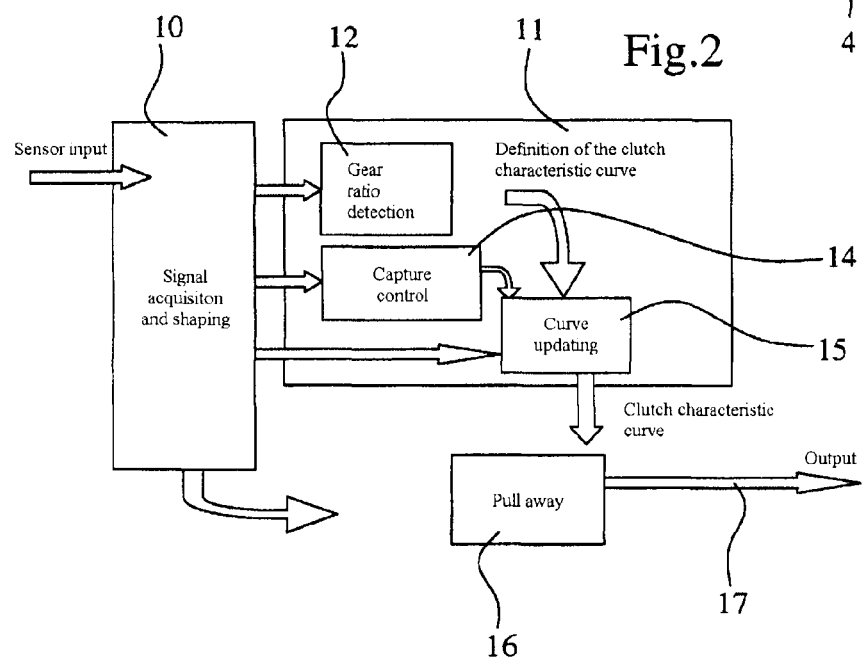

METHOD FOR PROCESSING A SIGNAL ORIGINATING FROM A POSITION SENSOR OF A MOTOR VEHICLE CONTROL MEMBER

The invention relates to an assistance device for maneuvering a motor vehicle on a slope, and, more specifically, a method for processing a position signal from a control member of the vehicle, the position signal being used in this assistance device.

An assistance device of this type is known from application FR 2 828 450, the content of which is incorporated by reference in the present application. This device principally comprises a means for estimating slope on which the vehicle is positioned, a means for interpreting the driver's actions, a means for determining a clutch characteristic curve for the vehicle (that is to say a curve relating the position of the clutch pedal to the torque that can be transmitted by the clutch) and a means for automatically disabling a brake means of the vehicle. Because of these means, the motor vehicle can be held in position on a slope in a state in which the driving wheels are disengaged from the engine, and can be moved (in the uphill direction) by the driver's actions on the accelerator and clutch pedals alone (that is to say, without any need to operate the parking brake). The operating strategy of the assistance device is that of releasing the brake when the engine torque transmitted to the wheels is sufficient to compensate the force on the vehicle due to the slope and gravity.

Owing to the reaction time required for the brake system to be released, the torque which is transmitted by the clutch is determined, not on the basis of the instantaneous position of the clutch pedal, but on the basis of an anticipated position of the clutch pedal, that is to say an estimate of what the position of the clutch pedal will be at the moment when the brake is released. This anticipated position is calculated by using the instantaneous derivative of the value of the clutch pedal position, which is multiplied by a predetermined time constant, the result being added to the value of the instantaneous clutch pedal position.

This type of device has a number of drawbacks. It lacks robustness. This is because the noise present in the signal originating from a clutch pedal position sensor is such that it interferes to a very considerable extent with the value of the anticipated clutch pedal position. This interference can be such that the release of the brake system may take place too soon or too late. Furthermore, the device gives rise to difficulties in handling rapid movements of the clutch pedal.

The object of the invention is to provide a method for processing a clutch pedal position signal which overcomes the aforementioned drawbacks and which improves the known determination procedures of the prior art. In particular, the invention proposes a method of determination which prevents the excessively early or late release of the brake system.

According to the invention, the method can be used to process a signal originating from a position sensor of a motor vehicle control member, and is intended to generate a processed signal relating to the position of the control member. It is characterized in that it comprises:

- a filtering phase in which the signal originating from the sensor is filtered using a first filter in order to obtain a first filtered signal,
- a substitution phase in which the first filtered signal is supplied as the processed signal, a second signal being added thereto if the instantaneous value of the first filtered signal is greater than the value of a first threshold parameter, and in which, in the opposite case, the signal originating from the sensor is supplied as the processed signal.

The second signal can be a function of a third signal obtained by filtering the signal originating from the sensor by means of a third filter, and subsequently by derivation with respect to the resulting signal time.

The second signal can be limited by the values of a second parameter and a third parameter.

The values of the second and third parameters can be opposite.

The second signal can be obtained by multiplying the third signal by the value of a fourth parameter.

The value of the fourth parameter can be a predetermined constant.

The value of the fourth parameter can be variable.

The value of the first parameter can be a predetermined constant.

The value of the first parameter can be deduced from a characteristic quantity of the control member.

The data medium according to the invention comprises an algorithm for implementing the processing method defined above.

According to the invention, the device for processing the signal originating from a position sensor of a control member of a motor vehicle, intended to generate a processed signal relating to the position of the control member, is characterized in that it comprises hardware and software means for implementing the processing method defined above.

The hardware means can comprise a first filter, a second filter, calculation means, a memory and derivation means.

According to the invention, the assistance device for maneuvering a motor vehicle on a slope is characterized in that it comprises a processing device defined above.

The appended drawing shows, by way of example, an embodiment of an assistance device according to the invention and a mode of application of a method for determining an anticipated position of a clutch pedal according to the invention.

FIG. 1 is a diagram of a vehicle fitted with the assistance device according to the invention.

FIG. 2 is a schematic flow chart showing the general operation of an assistance device according to the invention.

Figure 3:
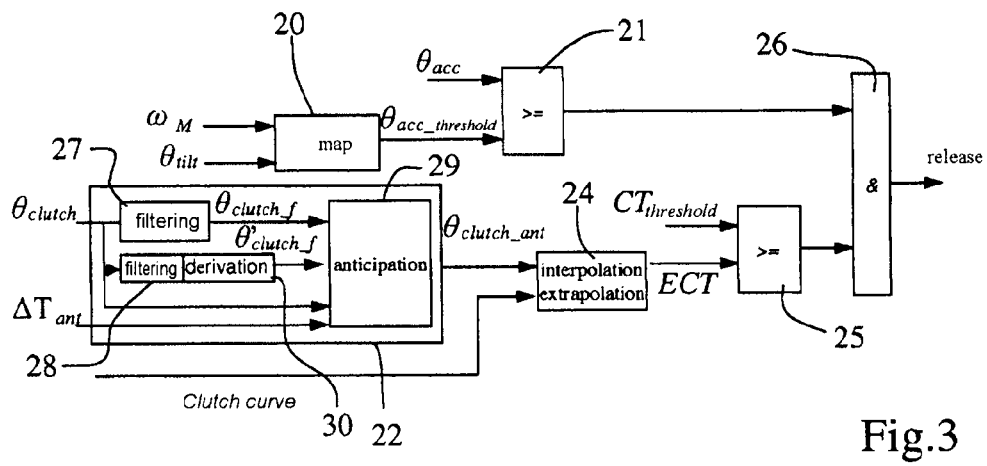
FIG. 3 is a schematic flow chart showing the detailed operation of the "pulling away" unit shown in the preceding drawing.

The motor vehicle 7 shown in FIG. 1 comprises a device 8 for assistance with maneuvering on slopes. This device is connected to the rest of the vehicle 6 with which it exchanges data via a CAN bus link 4.

The assistance device principally comprises:
a computer 1 connected to the CAN bus link, and
a sensor 2 of the slope on which the vehicle is positioned, a clutch pedal position sensor and a parking brake system 5, all connected to the computer.

The structure and operation of the assistance device are described in detail from line 23, page 12 to line 27, page 33 of the text of the French patent application FR 2 828 450-A1 with reference to FIGS. 1 to 8. In particular, its structure is described from line 23, page 12 to line 16, page 16 with reference to FIGS. 1 and 2, and from line 4, page 20 to line 23, page 22 with reference to FIG. 4.

In particular, the parking brake system is described from line 10, page 14 to line 11, page 15 of the aforementioned publication, with reference to FIG. 2.

The rest of the vehicle comprises the conventional members of a present-day vehicle, particularly means for determining and transmitting vehicle data such as the engine speed, the velocity, or the position of the accelerator pedal.

The rest of the description will use various physical quantities and their symbols, a list of which is given below with their meanings:

CT Torque transmitted by the clutch
$\theta_{acc}$ Accelerator pedal position signal
$\theta_{clutch}$ Clutch pedal position signal
$\theta'_{clutch}$ Signal of the derivative of the clutch pedal position
$\theta_{tilt}$ Slope of the incline on which the vehicle is positioned,
m Mass of the vehicle
b Position of the gear lever
r(b) Relation giving the demultiplication ratio between the engine output shaft and the driving wheel shaft as a function of the gear lever position
$\rho_{wheels}$ Radius of the driving wheel tires under load
$\omega_M$ Engine speed.

As described above, the engine of the vehicle of mass m parked on a slope $\theta_{tilt}$ must provide a torque greater than $CT_{threshold}$ to make the vehicle move forward.

$CT_{threshold}$=r(b)×$\rho_{wheels}$×m×g×sin($\theta_{tilt}$), where g is the norm of the Earth's gravitational field.

As explained, according to the strategy used by the assistance device, the brake system is released when the vehicle is stationary in the engagement phase as soon as the torque transmitted by the clutch is estimated to be greater than the torque $CT_{threshold}$. A complicated operation carried out by the assistance device is required for this estimation of the transmitted torque. For this purpose, the assistance device uses, in particular, a data element on the anticipated position of the clutch pedal and a clutch characteristic curve.

The general operation of the assistance device is explained below with reference to FIG. 2.

The signals from the various sensors fitted to the vehicle are acquired and shaped in a first functional block 10. These signals are transmitted, for example, via the CAN bus link.

The clutch characteristic curve is determined in a second functional unit 11. This unit comprises:
  a sub-unit 12 in which the currently selected gear ratio is determined,
  a sub-unit 14 in which the data, for example the data on the clutch pedal position and on the torque transmitted by the clutch, are acquired, and
  a sub-unit 15 in which the data from the unit 10 and from the sub-units 12 and 14 are used to update the clutch characteristic curve.

In a third functional unit 16, the clutch characteristic curve determined in unit 11 and data from unit 10 are used to determine the desired state of an output 17 which controls the release of the parking brake system.

The structure of the units 10 and 11 and their operation are identical to those described in the published text of the application FR 2 828 450-A1.

The operation of this third functional unit 16 is described in detail below with reference to FIG. 3.

A first comparator 20 delivers, as a function of the engine speed and the slope on which the vehicle is positioned, a threshold position of the accelerator pedal, below which the brake system release command must not be sent. This threshold position is determined by means of a map; that is to say that data which are stored in a memory of the assistance device show a threshold value of position corresponding in dimensions to values of engine speed on the horizontal axis and values of slope on the vertical axis.

The instantaneous position of the accelerator pedal $\theta_{acc}$ is compared in a comparator 21 with the threshold value found at the output of the unit 20. If the value of the instantaneous accelerator pedal position is greater than the threshold value found at the output of the comparator 20, the output of the comparator 21 is active or in the high state.

The data relating to the clutch pedal position and a time parameter $\Delta T_{ant}$ are used in a signal processing device 22 to supply at the output a signal relating to the anticipated position of the clutch pedal $\theta_{clutch\_ant}$.

For this purpose, the position signal $\theta_{clutch}$ originating from the clutch pedal position sensor 3 is supplied to a first filter 27. This first filter is a low-pass filter. If a first-order filter is used, for example, the time constant can be set at 0.03 seconds. A filtered position signal $\theta_{clutch\_f}$ is then obtained at the output of the first filter. The cutoff frequency of the first filter can, for example, be 10 Hz, and this parameter can be adjusted when the system is being set.

The position signal $\theta_{clutch}$ originating from the clutch pedal position sensor 3 is also supplied to a second filter 28. This second filter is a low-pass filter. If a first-order filter is used, for example, the time constant can be set at 0.05 seconds. The cutoff frequency of the second filter can, for example, be 10 Hz, and this parameter can be adjusted when the system is being set. At the output of the second filter, a filtered position signal is then obtained, and this is applied to a derivation means 30. The signal sent from the derivation means is a signal relating to the derivative of the filtered clutch pedal position, and is denoted $\theta'_{clutch\_f}$.

The two signals obtained as described above, together with the signal originating from the clutch pedal position sensor and the value of the time parameter $\Delta T_{ant}$, are supplied to a computer means 29 in which a series of mathematical operations are performed on the signals (which are detailed below) to obtain an anticipated clutch pedal position signal $\theta_{clutch\_ant}$.

An example of a very simple way of producing the low-pass filters is the use of passive electronic resistor and capacitor circuits in series, the signal to be filtered being applied to the terminals of the series system of the circuit and the filtered signal being obtained at the terminals of the capacitor. A numerical first-order filter can also be provided, for example:

$$Y(K) = -\frac{Ts - 2 \cdot \tau}{Ts + 2 \cdot \tau} \cdot Y(K-1) + \frac{Ts}{Ts + 2 \cdot \tau} \cdot [X(K) - X(K-1)]$$

where Ts is the sampling period and $\tau$ is the time constant of the filter.

The derivation means 30 can be produced using the same type of circuit, the signal to be derived being applied to the terminals of the series system of the circuit and the derived signal being obtained at the terminals of the resistance. A numerical form of this means is also possible, for example:

$Y(K)=[X(K)-X(K-n)]/nTs$ where Ts is the sampling period and n is the number of elements for the derivation.

The various filters, the derivation means and the computer means can be housed in a single electronic component such as the computer 1 of the assistance device 8.

In an interpolation/extrapolation means 24, the clutch characteristic curve and the anticipated clutch pedal position are used to obtain, by interpolation or extrapolation, an estimate ECT of the torque transmitted by the clutch.

This estimated torque is compared in a comparator 25 with the torque $CT_{threshold}$ required to make the vehicle move forward. If the estimated value of the torque transmitted to the clutch is greater than the torque $CT_{threshold}$ required to make the vehicle move forward, the output of the comparator 25 is active or in the high state.

The outputs of the comparators 21 and 25 are sent to a logical AND gate 26 whose output, when active or in the high state, causes the release of the brake system.

Figure 4:
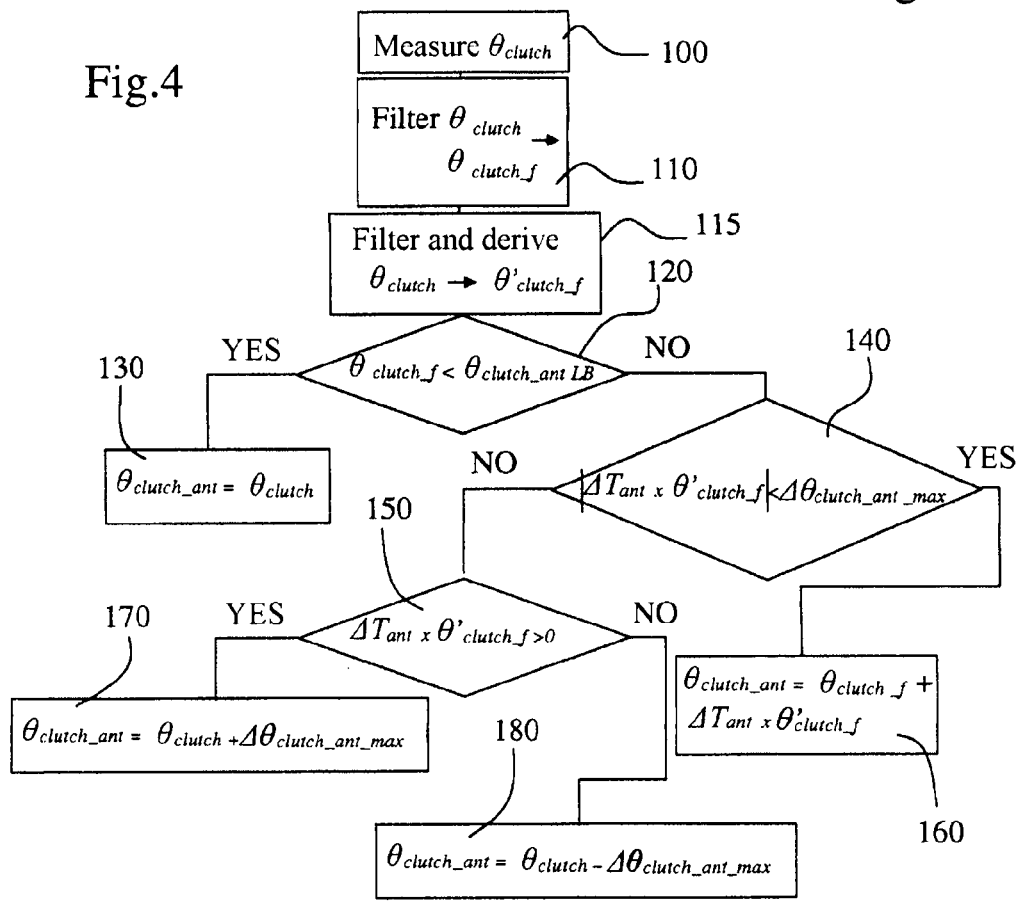
FIG. 4 is a flow chart of a mode of application of a method for determining an anticipated position of a clutch pedal according to the invention.

An example of a mode of application of the processing method according to the invention is described below with reference to FIG. 4.

In a first step 100, a clutch pedal position signal $\theta_{clutch}$ is determined by means of the sensor 3.

In a second step 110, this signal is filtered by means of the filter 27 to generate a filtered position signal $\theta_{clutch\_f}$.

In a third step 115, the position signal $\theta_{clutch}$ is filtered by means of the filter 28 and is then derived to generate a derived filtered position signal $\theta'_{clutch\_f}$.

Since all these signals are supplied to the computer means 29, a test is carried out in a step 120 to discover whether the instantaneous value of the filtered signal $\theta_{clutch\_f}$ is less than the value of a parameter $\theta_{clutch\_antLB}$. If this is the case, the procedure goes on to a step 130 in which the computer means supplies at its output an anticipated clutch pedal position signal $\theta_{clutch\_ant}$ which is the signal $\theta_{clutch}$ originating from the sensor 3. If this is not the case, the procedure goes on to a step 140.

In this step 140, a test is carried out to determine whether the absolute value of the product of the time parameter $\Delta T_{ant}$ and the instantaneous value of the derived filtered position signal $\theta'_{clutch\_f}$ is less than the value of a parameter $\Delta\theta_{clutch\_ant\_max}$. If this is the case, the procedure goes on to a step 160 in which the computer means supplies at its output an anticipated clutch pedal position signal $\theta_{clutch\_ant}$ which is the sum of the signal $\theta_{clutch}$ and the signal which is the product of the time parameter $\Delta T_{ant}$ and the derived and filtered position signal $\theta'_{clutch\_f}$; that is to say, $$\theta_{clutch\_ant} = \theta_{clutch\_f} + \Delta T_{ant} \times \theta'_{clutch\_f}$$

If this is not the case, the procedure goes on to a step 150.

In this step 150, a test is carried out to determine whether the product of the time parameter $\Delta T_{ant}$ and the instantaneous value of the derived and filtered position signal $\theta'_{clutch\_f}$ is positive. If this is the case, the procedure goes on to a step 170 in which the computer means supplies at its output an anticipated clutch pedal position signal $\theta_{clutch\_ant}$ which is the sum of the signal $\theta_{clutch}$ and the value of the parameter $\Delta\theta_{clutch\_ant\_max}$; that is to say, $$\theta_{clutch\_ant} = \theta_{clutch\_f} + \Delta\theta_{clutch\_ant\_max}.$$

If this is the case, the procedure goes on to a step 180 in which the computer means supplies at its output an anticipated clutch pedal position signal $\theta_{clutch\_ant}$ which is the difference between the signal $\theta_{clutch}$ and the value of the parameter $\Delta\theta_{clutch\_ant\_max}$; that is to say, $$\theta_{clutch\_ant} = \theta_{clutch\_f} - \Delta\theta_{clutch\_ant\_max}.$$

The values of the various parameters mentioned above are stored in a memory of the assistance device, for example in a memory of the computer 1. The values of these parameters can be constant and predetermined. Alternatively, they can be variable and can be determined, for example, as a function of the situation of the vehicle at a given time.

Thus, the parameter $\theta_{clutch\_antLB}$ can be deduced during the life of the vehicle, for example by using a parameter $\Delta\theta_{clutch\_antLB}$, a predetermined value of which would be stored in the memory. During the life of the vehicle, it would be possible to determine the clutch pedal position at which the clutch plates just come into contact and then to subtract the parameter $\Delta\theta_{clutch\_antLB}$ from this position value. In this way, the value of the parameter $\theta_{clutch\_antLB}$ would be variable according to the wear on the clutch.

The values of the parameters $\Delta\theta_{clutch\_ant\_max}$ and $\Delta T_{ant}$ can vary as a function of other parameters measured by the vehicle sensors. For example, they can vary with the slope on which the vehicle is positioned. The value of the parameter $\Delta T_{ant}$ is preferably less than 0.2 seconds. If the value of the parameter $\Delta T_{ant}$ is zero, there is no anticipation.

Because of this processing method, the estimation of the value of the anticipated clutch pedal position is robust. The various forms of interference have little effect on this value, and the brake system can be released at the correct time.

The invention claimed is:

1. A method for providing a processed signal relating to a position of a driver operated vehicle control member for a motor vehicle, the method comprising:
   obtaining a signal originating from a sensor which senses a position of the vehicle control member;
   filtering the signal originating from the sensor using a first filter, to obtain a first filtered signal;
   comparing, using a computing device, an instantaneous value of the first filtered signal with a first threshold parameter value representing a predetermined position of the control member;
   providing as the processed signal the first filtered signal having a second signal added thereto when the comparing step indicates that the instantaneous value of the first filtered signal is greater than the first threshold parameter; and
   providing the signal originating from the sensor as the processed signal when the first filtered signal is not greater than the first threshold parameter, wherein said driver operated vehicle control member is a manual clutch pedal of the vehicle.

2. The method as claimed in claim 1, wherein the second signal is a function of a third signal obtained by filtering the signal originating from the sensor using a second filter to obtain a resulting signal, and then by derivation of the resulting signal with respect to time.

3. The method as claimed in claim 2, wherein the second signal is limited by values of a second parameter representing a change in time and of a third parameter representing a maximum change in maximum position of the control member.

4. The method as claimed in claim 3, wherein the values of the second and third parameters are positive and negative respectively, or the opposite relationship.

5. The method as claimed in claim 2, wherein the second signal is obtained by multiplying the third signal by a value of a fourth parameter representing a change in position of the control member.

6. The method as claimed in claim 5, wherein the value of the fourth parameter is a predetermined constant.

7. The method as claimed in claim 5, wherein the value of the fourth parameter is variable.

8. The method as claimed in claim 1, wherein the value of the first parameter is a predetermined constant.

9. The method as claimed in claim 1, wherein the value of the first parameter is deduced from a state of the control member.

10. A non-transitory computer readable storage medium with an executable program stored thereon, wherein the program instructs a processor to perform the method as claimed in claim 1.

11. A device for providing a processed signal relating to a position of a manual clutch pedal for a vehicle, comprising:
- a sensor which senses a position of the manual clutch pedal and originates a signal representing said position;
- a first filter configured to filter said signal originated by the sensor to obtain a first filtered signal;
- a processor coupled to a memory, wherein the processor is programmed to:
    - compare an instantaneous value of the first filtered signal with a first threshold parameter value stored in said memory and representing a predetermined position of the manual clutch pedal;
    - provide as the processed signal the first filtered signal having a second signal added thereto when the comparing step indicates that the instantaneous value of the first filtered signal is greater than the first threshold parameter, and
    - provide the signal originated by the sensor as the processed signal when the first filtered signal is not greater than the first threshold parameter.

12. The device as claimed in claim 11, further comprising a first filter, a second filter, a computer including said processor and a derivation calculator.

13. The method of claim 1, wherein said threshold parameter value is an anticipated clutch pedal position provided by said processor.

* * * * *